(12) United States Patent  
Bouchard et al.

(10) Patent No.: US 12,018,978 B2  
(45) Date of Patent: Jun. 25, 2024

(54) METHOD AND APPARATUS TO MONITOR A RESERVOIR OR A STRUCTURE

(71) Applicant: Technologies Intelia Inc., Joliette (CA)

(72) Inventors: Claude Bouchard, Lanoraie (CA); Josee Samson, Lanoraie (CA)

(73) Assignee: TECHNOLOGIES INTELIA INC., Joliette (CA)

( * ) Notice: Subject to any disclaimer, the term of this patent is extended or adjusted under 35 U.S.C. 154(b) by 494 days.

(21) Appl. No.: 17/265,711

(22) PCT Filed: Aug. 5, 2019

(86) PCT No.: PCT/CA2019/051072  
§ 371 (c)(1),  
(2) Date: Feb. 3, 2021

(87) PCT Pub. No.: WO2020/024067  
PCT Pub. Date: Feb. 6, 2020

(65) Prior Publication Data  
US 2022/0214206 A1 Jul. 7, 2022

Related U.S. Application Data

(60) Provisional application No. 62/714,647, filed on Aug. 3, 2018.

(51) Int. Cl.  
*G01G 3/12* (2006.01)  
*G01G 17/04* (2006.01)  
(Continued)

(52) U.S. Cl.  
CPC .............. *G01G 3/12* (2013.01); *G01G 17/04* (2013.01); *G01G 21/28* (2013.01); *G01G 23/02* (2013.01)

(58) Field of Classification Search  
CPC .......... G01G 3/12; G01G 17/04; G01G 23/02; G01G 21/28  
See application file for complete search history.

(56) References Cited

U.S. PATENT DOCUMENTS 4,515,232 A * 5/1985 Rubinstein ........... G01G 3/1412  
                                                                             177/211  
4,593,778 A * 6/1986 Konishi ................. G01G 23/06  
                                                                             177/229  
(Continued)

FOREIGN PATENT DOCUMENTS

CN             201569478 U     9/2010

OTHER PUBLICATIONS

International Search Report dated Oct. 29, 2019 in the corresponding patent application PCT/CA2019/051072.

(Continued)

*Primary Examiner* — Randy W Gibson  
(74) *Attorney, Agent, or Firm* — Brouillette Legal Inc.; Robert Brouillette

(57) ABSTRACT

A system to monitor weight of a reservoir or a structure comprises a load cell which comprises an electrical or optical transducer to provide a proportional signal of the deformation, a load cell base support for holding the load cell on the ground substantially about the axis of the support element of the reservoir, a load cell support adapter to attach the loadcell to the support member of the reservoir. The cell support adapter may comprise an opening or a shouldering anchor aiming at facilitating attachment to a temporary lifting device.

21 Claims, 14 Drawing Sheets

(51) Int. Cl.
  *G01G 21/28*   (2006.01)
  *G01G 23/02*   (2006.01)

(56) References Cited

U.S. PATENT DOCUMENTS

| | | | | |
|---|---|---|---|---|
| 5,393,936 A * | 2/1995 | Tyhy | ................... | G01G 19/12 |
| | | | | 177/199 |
| 5,770,823 A | 6/1998 | Piroozmandi | | |
| 5,923,000 A * | 7/1999 | Tschopp | ................... | G01L 1/26 |
| | | | | 177/229 |
| 6,320,142 B1 * | 11/2001 | Burton | ................... | G01G 21/23 |
| | | | | 177/DIG. 9 |
| 7,166,808 B2 * | 1/2007 | Viaud | ................... | G01G 19/08 |
| | | | | 56/432 |
| 9,612,150 B2 * | 4/2017 | Perrea | ................... | G01G 23/005 |
| 10,986,810 B2 * | 4/2021 | Hogan | ................... | G01G 17/00 |
| 2010/0243338 A1 * | 9/2010 | Budic | ................... | G01G 19/02 |
| | | | | 177/136 |
| 2012/0090901 A1 | 4/2012 | Jaeger | | |

OTHER PUBLICATIONS

Image taken from Scale-Tron Inc. (Author unknown) URL of the company website: https://scaletron.com/silo-inventory/siloweigh-sensors/.

* cited by examiner

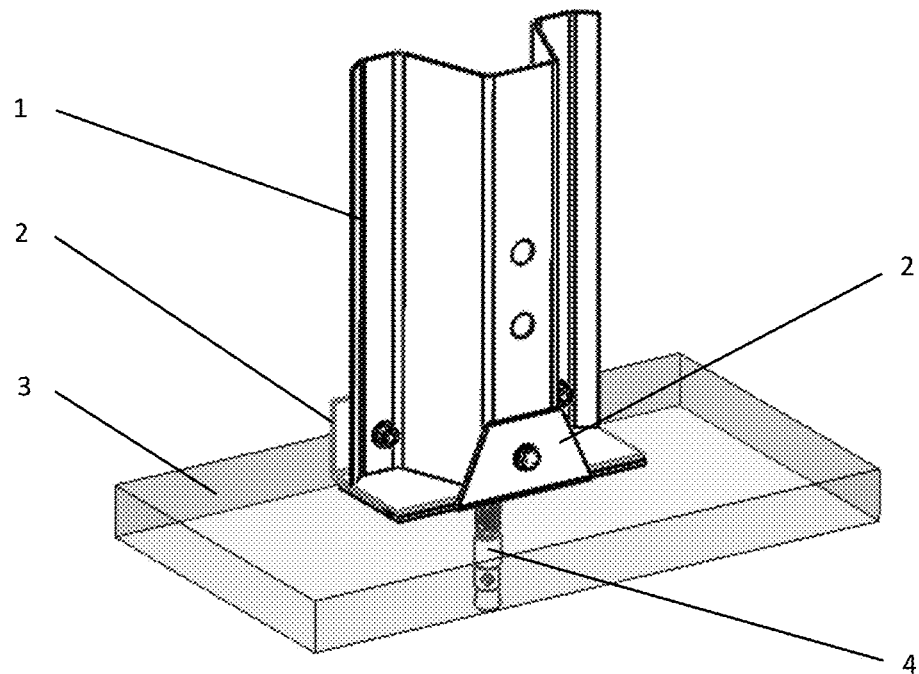
FIG. 1A - PRIOR ART
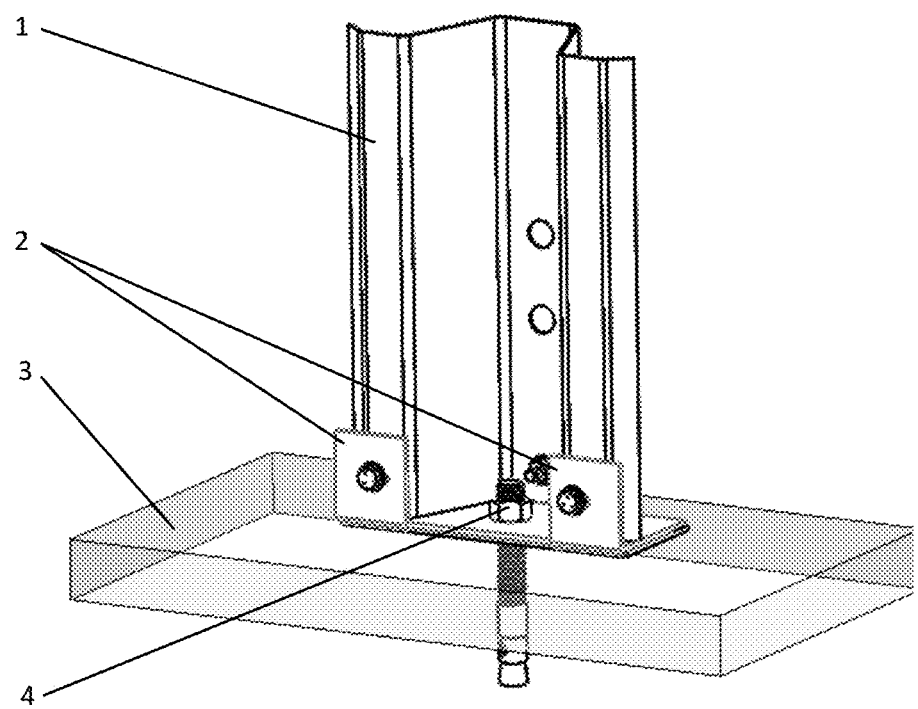
FIG. 1B - PRIOR ART

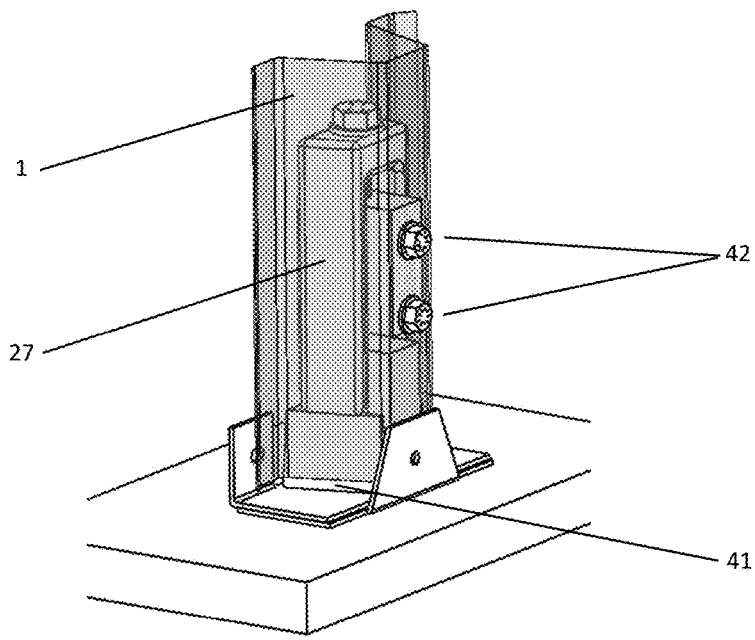
FIG. 2C
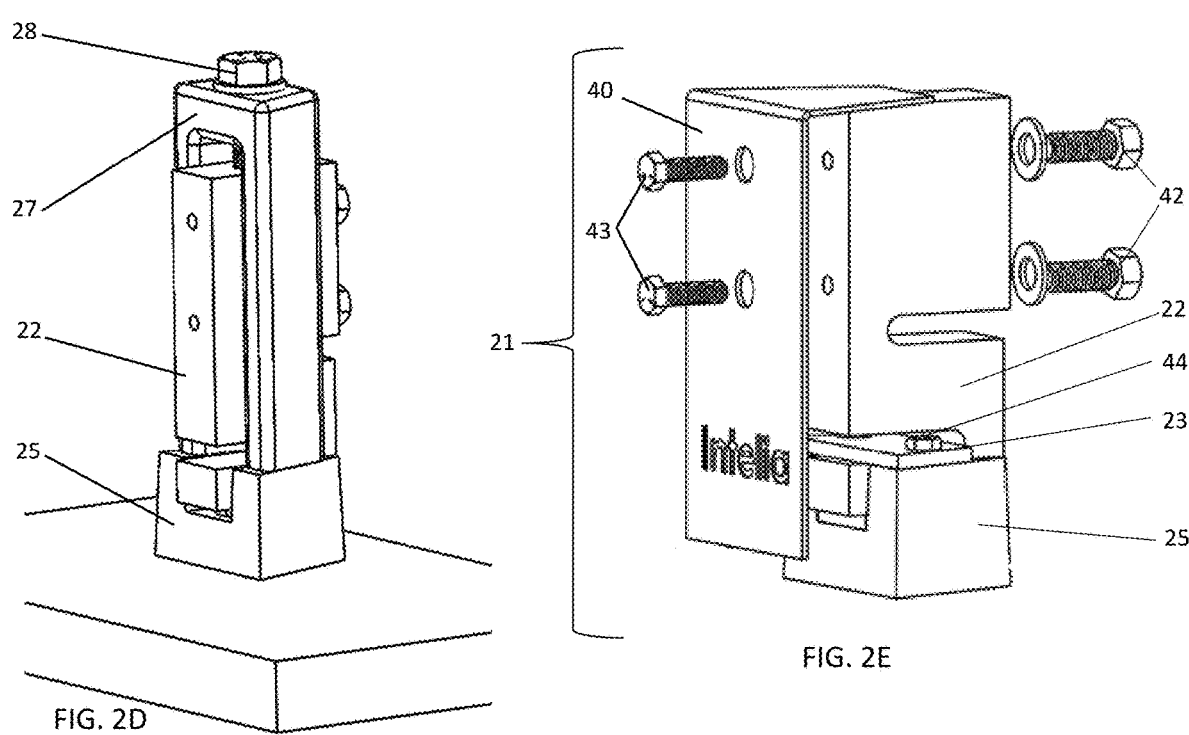
FIG. 2D
FIG. 2E

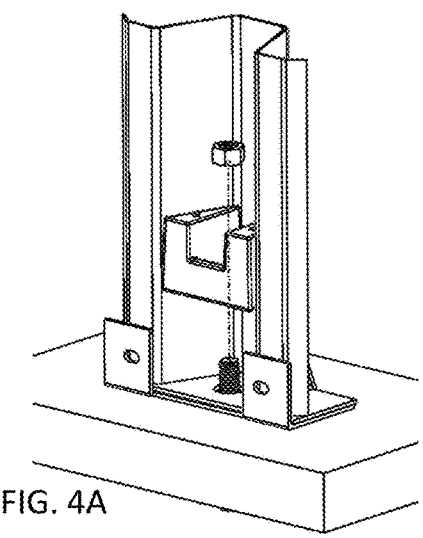
FIG. 4A
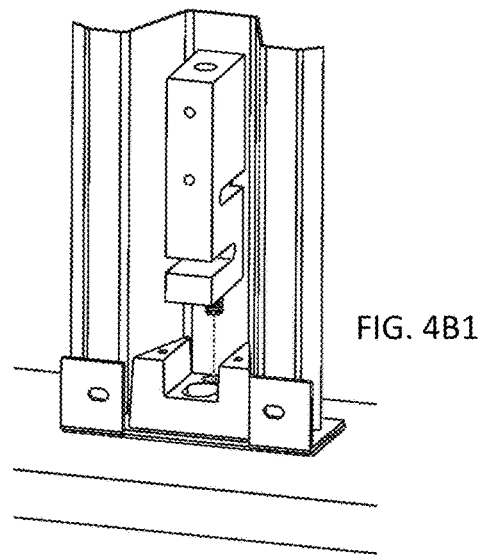
FIG. 4B1
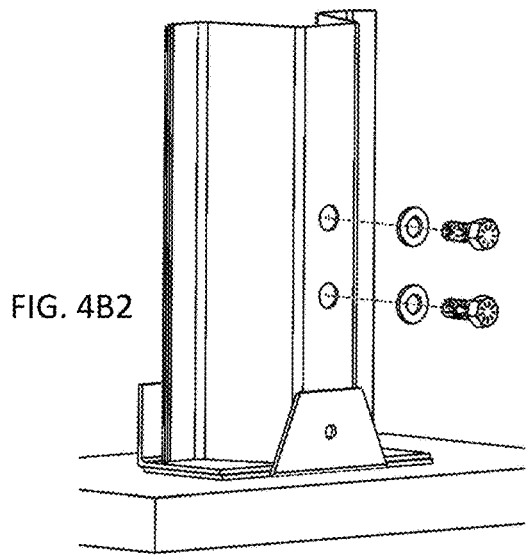
FIG. 4B2

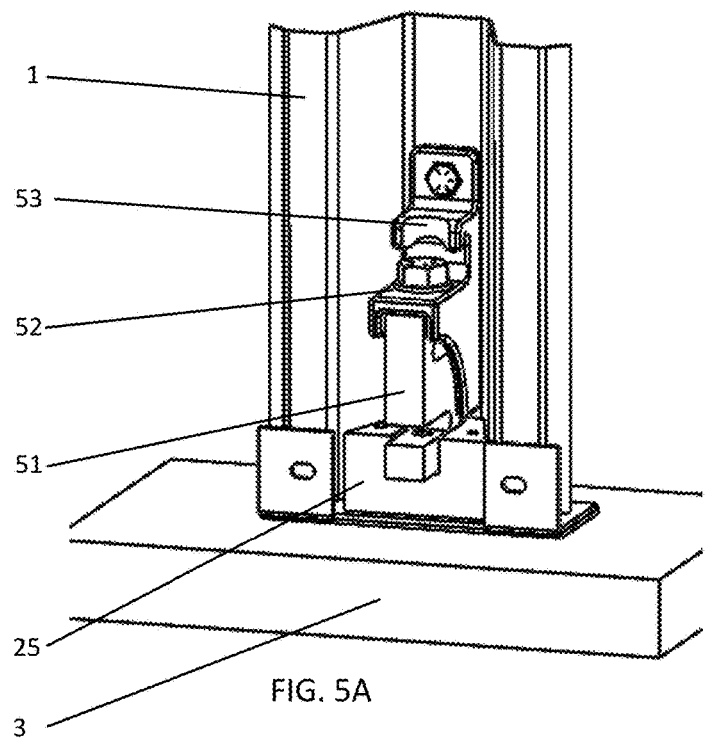
FIG. 5A
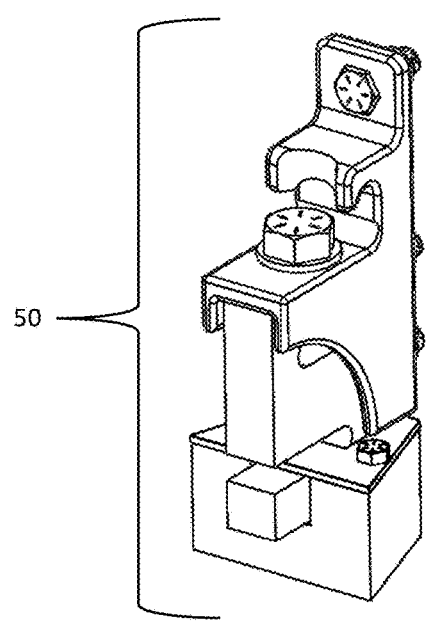
FIG. 5A1
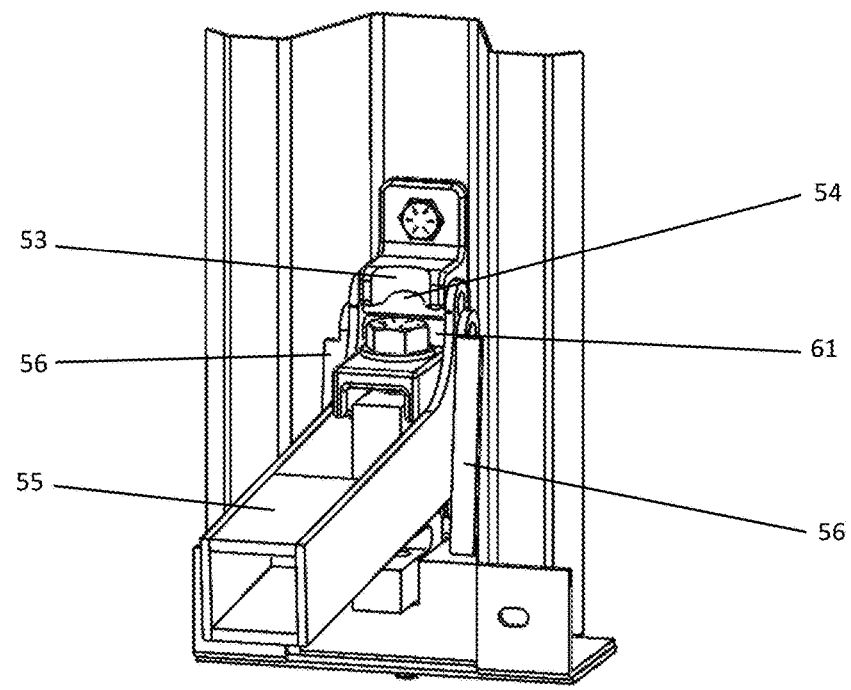
FIG. 5B

METHOD AND APPARATUS TO MONITOR A RESERVOIR OR A STRUCTURE

CROSS-REFERENCE TO RELATED APPLICATIONS

The present patent application claims the benefits of priority of U.S. Provisional Patent Application No. 62/714,647, entitled "METHOD AND APPARATUS TO MONITOR A RESERVOIR OR A STRUCTURE" and filed at the United States Patent and Trademark Office on Aug. 3, 2018.

FIELD OF THE INVENTION

The present invention generally relates to the field of load cells, and more particularly to devices and methods for weighting and lifting reservoir, tank, silo or other types of structures.

BACKGROUND OF THE INVENTION

Many facilities, such as cattle farms, must provide the animals with an uninterrupted supply of food. Such task is typically done using a silo containing food, such as grains. However, as animal rely on food to live and grow, the silo shall always contain a minimum volume of food. When the silo is empty, important loses may occur which may translate in profit losses.

Solutions to the present problem have been addressed in the prior art. As an example, the PCT application published under no. WO 2018/039787 and filed by Technologies Intelia Inc discloses a method to lift, weight and monitor the content of a structure like feed bin or silo on a support structure. The disclosed system is adapted to lift a silo for the purpose of measuring weight of the content of the silo. A load cell is connected to a monitoring system which may generate alerts upon detection of abnormal activities, such as low volume of food. The content of the patent application published under no. WO 2018/039787 is incorporated to the present by reference.

Broadly, solutions proposed in the previous art document require to raise the structure from the ground and require strong supports. Such assemblies typically require an increased clearing of the ground to lift the bin. Some of the drawbacks of such systems include a required large footprint and contains heavy parts. Furthermore, the large size and the heavy weight of the prior art systems render difficult the manipulation of such heavy parts and require an important men effort during installation. Also, prior art systems may become unusable when the bin or silo is mounted or sits on blocks, such as concrete blocks.

Also, other systems, such as the system disclosed in U.S. Pat. No. 7,980,129, require an assembly connectable to the bin legs and supporting the load. Such assembly generally increases the complexity and costs of installation. Also, such system requires a plurality of pieces to properly attach the silo leg to the load cell. Such systems also require drilling holes in the concrete to fix the support to the ground.

Concerning other type of structures, several weighing equipments for feeding and weighing animals may also be mounted on load cells. When one or more load cells fail, the replacement is typically complex and requires lifting equipment or the structure.

In view of the drawbacks of prior art lifting and monitoring systems, there is thus a need for a system aiming at easing the installation and use of systems for monitoring and measuring weight of large structures.

SUMMARY OF THE INVENTION

The shortcomings of the prior art are generally mitigated by providing a method and apparatus for monitoring the weight of a structure such as a reservoir, tank, silo or any weighing platform by analyzing the variation in electric or optical signal of a strain gauge attached to a load cell supporting the weight of the said reservoir.

In the basic aspect of the present invention, a system for monitoring the weight of a silo is provided. The system comprises: a compression load cell equipped with mounting holes to attach the load cell to a support element of the structure, such as but not limited to a silo leg, an opening or a shouldering anchor facilities to attach a temporary lifting device and an electrical or optical transducer to provide a proportional signal of the deformation, a load cell base support for holding the load cell on the ground in the same axis as the axis of the support element of the structure, a shimming mechanism between the load cell base and the load cell, such shimming mechanism being typically inserted when the load cell is momentary lifted by the lifting device.

The temporary lifting device may be but is not limited to, a lever mechanism, a screw or a hydraulic leveling jack placed between load cell base support and the load cell anchor facility.

Advantageously, the footprint of the load cell may be significantly reduced once it is installed. Such limited footprint is well inferior to other known weighing system. Also, the installation time on existing structure may be substantially reduced as the invention does not require to drill additional holes in the concrete to install the weighing system.

In yet another aspect of the invention, the shimming mechanism may be replaced by a permanent lifting tools, such as but not limited, a screw leveling jack, used to lift and maintain the loadcell and the support member of the structure above the ground.

In another aspect of the invention, the load cell of the system is a custom designed «S type» or S-shaped load cell. Such load cell is adapted to monitor and lift the structure. The said load cell is connected to shear strain gauges which are mounted to about the center of a thin web in order to measure maximum shear deformation of the steel. Off-centered load is eliminated by the configuration of the strain gauges. The system may further comprise an electronic circuit board or central controller configured to monitor the electric or optical signal. The controller may further process the values to be displayed by a human machine interface. The controller may further be configured to analyse the values or data and to communicate or display alert regarding any problems related to the material weight residing inside the silo (ex.: silo almost empty). The present system may be installed without using a crane as the system may be auto lifted or self-lifted.

In yet another aspect of the invention, a method for monitoring the weight of a structure is provided. The method comprises the steps of fixing the base support to a solid surface, such as concrete, using bolts, such as the existing bolts in the solid surface. The method further comprises attaching the load cell to the support element of the structure at the level of the ground leg anchor plate or base support. The method also comprises to use the loadcell anchor facility and to lift the load cell and the support element of the structure. In some embodiments, the supported elements are typically attached only a few millimetres above the ground. The method may further comprise inserting a shimming mechanism between the base support and the load cell. The method may also comprise removing the lifting device.

The method may also comprise adding a fastener or locking element to attach the load cell base to the load cell as last step.

In embodiments using permanent lifting mechanisms, the method may skip inserting the shimming mechanism and/or removing the lifting tools.

In yet another aspect of the invention, the system comprises a load cell comprising an electrical or optical transducer to provide a proportional signal of the deformation, a load cell base support for holding the load cell on the ground substantially about the axis of the support element of the structure, a load cell support adapter to attach the loadcell to the support member of the structure. The cell support adapter may comprise an opening or a shouldering anchor aiming at facilitating attachment to a temporary lifting device.

In a further aspect of the invention, a method for monitoring the weight of a structure is provided. The method comprises the steps of fixing a base support to a solid surface, such as concrete, using bolts, such as bolts present or extending from the solid surface. The method further comprises attaching a load cell support adapter to a support element of the structure and using the load cell base support as an anchor to the solid surface. The method further comprises lifting the load cell support adapter and the support element attached to the structure above the ground and vertically positioning the load cell between the base support and the load cell support adapter. The method may further comprise removing the lifting device.

The method may comprise fastening or locking the load cell base and the load cell support adapter to the load cell.

The means to attach the load cell may also allow lifting of said load cell and support element.

In some embodiments, the device may further comprise a monitoring device for translating the variation in the signal outputted by the measuring mean such as strain gauge, brag network, vibrating wire strain gauge, propagation time technique.

In a further aspect of the invention, the system for lifting a silo may comprise a raising means, such a lever mechanism, adapted to facilitate the lifting of the structure.

In yet another aspect of the invention, a method for monitoring the weight of a structure is provided. The method comprises the steps of (a) attaching a load cell to support member of the structure, (b) mounting at least one measuring means to the load cell, (c) lifting the load cell and the support member. The method may further comprise repeating steps (a) to (c) for each support member of the structure and measuring an output signal of each of the load cells attached to each support member of the structure.

The invention generally aims at monitoring the actual weight and/or the variation of the weight of a structure such as a reservoir or a silo tank. The reservoir may contain any type of material, typically as liquid or solid material.

In typical embodiments of the invention, the silo or structure to be weighted is lifted about half an inch from its initial position. This reduced elevation allows a secure installation and eliminates the need to disconnect any feed supply line connected to the silo.

Furthermore, such configurations aim at improving stability of the monitoring process of the weight of the structure in windy weather as the silo leg is attached to the load cell, the load cell being connected to the load cell support or the support member of the system. Preferably, the support members are anchored to the ground or to a solid structure.

The lifting anchor is integrated to or an integral part of the load cell or the load cell support adapter. Advantageously, safe, quick and light lifting tools may be used to lift the support member of the structure in a substantially vertical axis without applying bending stress on the structure's support member.

In some embodiments, the load cell may be mounted as close as possible to the centroid of the support member of the structure to minimise the lateral effort which may cause imprecision in the deformation measurement.

The system may further comprise a monitoring device for translating the deformation of the load cell measured by the measuring mean in a signal simulating the weight of the structure.

In some embodiments, the method may further comprise a data analysis system to alert any problems related to the structure weight or its contents.

In yet other embodiments, the method may further comprise converting the measured deformation in a signal transducing the weight of the structure.

In additional embodiments, the method may further comprise covering and/or protecting the loadcell against perturbing or damaging elements such as but not limited snow, ice, grain, animal feed, gravel that can be lodged in spacings of the load cell or the load cell base support affecting free movement and planarity of the installation.

The structure may also comprise more than one supporting member, the method further comprising repeating all steps for each support element of the structure.

In one aspect of the invention a system for monitoring the weight of a structure having supporting members is provided. The system comprises a compression load cell comprising a deformation zone, the deformation zone comprising a deformation sensor measurement and a vertical attaching system for mounting to one of the supporting members of the structure. The system further comprises a load cell base adapted to: support the compression load cell and any force applied on the load cell and be attached to the ground. The system may further comprise a shim adapted to be inserted under the compression load cell to transfer the weight of the structural member of the reservoir through the load cell.

The compression load cell may further comprise an anchoring element adapted to attach a lifting device. The system may further comprise a removable lifting device adapted to be attached to the anchoring element, the removable lifting device being adapted to raise and lower at least one of the supporting members of the reservoir attached to the load cell. The removable lifting device may further be adapted to allow the insertion or removal of a shim under the load cell. The anchoring element may be a threaded hole.

The removable lifting device may further comprise a rigid structure forming a bridge over the compression load cell, the rigid structure being supported on the load cell base on each side of the compression load cell and a lifting member adapted to be attached yet detachable to the lifting device, the lifting member being adapted to raise and lower the compression load cell within the bridge structure. The lifting member may be a threaded bolt.

The load cell base may comprise a cavity adapted to receive the load cell and to increase the rigidity of the load cell to the ground. The system may further comprise a retaining plate adapted to be mounted to the load cell base.

The load cell base may form a footprint shaped as a trapeze. The supporting members being shaped as "W" and the trapeze shape of the load cell base may be adapted to fit inside or outside of the supporting member.

The load cell base may comprise an aperture adapted be aligned with standard ground anchor to attach the supporting member to the ground. The system may comprise a retaining plate adapted to limit the upward movement of the load cell. The system may further comprise a soft protecting material inserted in apertures of the load cell or may comprise a soft protecting material inserted below the support member when the support member of the structure is lifted.

In another aspect of the invention, a system for monitoring the weight of a structure having supporting members is provided. The system comprises a compression load cell, a support member adapter comprising a back portion adapted to be attached to one of the support members of the structure and a load cell top receiving portion. The system further comprises a load cell base adapted to support the compression load cell and any force applied on the load cell and be mounted to the ground.

The system may further comprise a lifting device, the support member adapter further comprising an anchor facility, the anchor facility being adapted for the lifting device to grip the support member adapter. The system may comprise a lifting device, the lifting device comprising a lever support member adapted to be supported by the load cell base, a lifting handle pivoting on the support members adapter and acting as a lever and a pivotable grip pin attached to the lifting handle and adapted to be inserted in the anchor facility of the load cell adapter. When the lifting handle is downwardly pivoted, the load cell is raised and when the lifting is upwardly, the load cell is lowered.

The load cell base may further comprise a cavity adapted to receive the load cell and to increase the rigidity of the load cell to the ground. The system may further comprise a retaining plate adapted to be mounted to the load cell base. The load cell base may form a footprint shaped as a trapeze and/or the supporting members may be shaped as "W" and the trapeze shape of the load cell base is adapted to fit inside or outside of the supporting member.

The load cell base may comprise an aperture adapted be aligned with standard ground anchor to attach the supporting member to the ground. The system may comprise a retaining plate adapted to limit the upward movement of the load cell. The system may comprise a soft protecting material inserted in apertures of the load cell and/or a soft protecting material inserted below the support member when the support member of the structure is lifted.

A method for monitoring the weight of a structure, the method comprises attaching a load cell base to a solid surface, seating the load cell on a load cell base, attaching the load cell to a support element of the structure, installing a lifting device on the load cell, using the lifting device to raise the load cell, when lifted, inserting a shim between the load cell and the load cell base and lowering the lifted load cell until the load cell seats on the shim.

The method further may further comprise removing the lifting device and/or attaching the load cell to the load cell base. The method may further comprise covering the load cell. The method may further comprise inserting a soft protecting material below the support member of the lifted structure and/or inserting a soft protecting material in one or more aperture of the load cell.

In a further aspect of the invention, a method for monitoring the weight of a structure is provided. The method comprises attaching a load cell base to a solid surface; attaching a load cell adapter to a support element of the structure, installing a lifting device to the load cell adapter, using the lifting device to raise the load cell adapter, inserting the load cell between a load cell adapter and a load cell base, upon insertion of the load cell and removing the lifting device.

The method further comprising attaching the load cell to the load cell base and/or covering the load cell. The method may further comprise inserting a soft protecting material below the support member of the lifted structure and/or inserting a soft protecting material in one or more aperture of the load cell. The method may further comprise using a lifting handle supported by the load cell base and pivoting until the space required to inserting the load cell is reached.

In a further aspect of the invention, a system to measure the weight applied on a rigid surface by a supporting member of a structure is provided. The system comprises a load cell assembly comprising a side mount fastener attaching a side portion of the load cell assembly to a side portion of the supporting member of the structure, a rigid base adapted to vertically support the load cell assembly and a deformation zone between the side mount connector and the rigid base, the deformation zone comprising a deformation measurement sensor measuring the load supported by the side mount fastener. The system further comprises a shim arranged to maintain the supporting member attached to load cell assembly with the side mount fastener at an elevation above the rigid surface when inserted between the load cell assembly and a load cell assembly base. The load cell assembly base is shaped to support and hold the rigid base of the load cell assembly and the shim and is attachable to the rigid surface.

The load cell assembly may further comprise an anchoring element attachable to a lifting device, the lifting device being adapted to lift the load of the supporting member. The load cell assembly may be a compression load cell. The anchoring element may comprise a linking element adapted to mate with the anchoring element, the lifting device being adapted to raise and lower the supporting member attached to the load cell assembly. The lifting device may be removable. the anchoring element comprising a threaded hole on the load cell assembly and a threaded bolt.

The lifting device may further be adapted to lift the load cell assembly to allow the insertion or removal of the a shim under the load cell assembly.

The system may further comprise a retaining plate adapted to be mounted to the load cell base assembly and to maintain the load cell assembly on the load cell assembly base.

The load cell base may comprise an aperture adapted to be aligned and to mate with a fastening element of the rigid surface.

The load cell assembly base may comprise a counterbore adapted to contain a fastener attaching the load cell assembly base to the rigid surface and being adapted to support the rigid base of the load cell assembly over the counterbore. The load cell assembly base may further comprise a recess adapted to receive the rigid base of the load cell assembly and the shim.

In yet another aspect of the invention, a system to measure the weight applied on a rigid surface by a structure comprising a plurality of supporting members supported by a rigid surface may be provided, each of the supporting members having a system to measure the weight of a supporting member as described above.

In a further aspect of the present invention, a system to measure the weight applied on a rigid surface by a supporting member of a structure is provided. The system comprises an adapter assembly comprising a rigid side wall attached to the side portion of the supporting member of the structure with a fastening device and a top seat adapted to transfer the load of the supporting member to a top portion of a compression load cell. The system further comprising a load cell base being shaped to support and hold a bottom portion of the compression load cell and support the load applied on the compression load cell and mountable to the rigid surface. The compression load cell measures a load applied between the top portion and the bottom portion and lifting the supporting member at an elevation above the rigid surface when the compression load cell is in-between the supporting the adapter assembly and the load cell base.

The adapter assembly may further comprise an anchoring element adapted to attach a lifting device. The anchoring element may be a hook. The load cell base may comprise an aperture adapted to be aligned and to mate with a fastening element of the rigid surface.

The load cell base may comprise a counterbore adapted to contain a fastener attaching the load cell base to the rigid surface and being adapted to support the bottom portion of the compression load cell over the counterbore. The load cell base may comprise a recess adapted to receive the bottom portion of the compression load cell. The top seat extending from the rigid side wall and being adapted to receive a top portion of the compression load cell In yet another aspect, a system to measure the weight applied on a rigid surface by a structure comprising a plurality of supporting members supported by a rigid surface is provided. In such system, each of the supporting members has a system to measure the weight of a supporting member as described above.

In a further aspect of the present invention, a method for measuring the weight applied on a rigid surface by a supporting member of a structure is provided. The method comprises attaching a load cell base to the rigid surface, seating a first portion of a load cell below a deformation measurement sensor of the load cell on the load cell base, attaching a second portion of the load cell over the deformation measurement sensor to a side portion of the supporting member, lifting the load cell attached to the supporting member. when the load cell is raised, inserting a shim between the load cell and the load cell base and lowering the lifted load cell until the load cell seats on the shim.

Lifting the load cell further may further comprise operatively connecting a lifting device to the load cell and the lifting device raising the load cell.

In a further aspect of the invention, a method for measuring the weight applied on a rigid surface by a structure having a plurality of supporting members comprising executing the method above for each of the supporting members is provided.

In another aspect of the present invention, a method for measuring the weight applied on a rigid surface by a supporting member of a structure is provided. The method comprises attaching a load cell base to the rigid surface, attaching a side portion of a load cell adapter to a side portion of a supporting member of the structure, wherein distance between the load cell adapter and the load cell base is lower than the height of the load cell, installing a lifting device to the load cell adapter, using the lifting device to raise the load cell adapter to a height allowing the load cell to be inserted between the load cell adapter and the load cell base, inserting the load cell between the load cell adapter and the load cell base and, upon insertion of the load cell, removing the lifting device.

In a further aspect of the invention, a method for measuring the weight applied on a rigid surface by a structure having a plurality of supporting members comprising executing the method above for each of the supporting members is provided.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIGS. 1A and 1B are front and rear perspective views of a prior art support element of a structure without a weighing system.

FIG. 2C is a rear perspective view of the apparatus to monitor the weight of the structure of FIG. 2A and its contents, the structure being shown in a lifted position by the 'n' shaped lifting device.

FIG. 2D is a front perspective view of the apparatus to monitor the weight of the structure of FIG. 2C and its content, the structure being shown without a ground leg anchor plates and a structure leg.

FIG. 2E is a front perspective view of the apparatus to monitor the weight of the structure of FIG. 2A and its contents shown without the ground leg anchor plates and the structure leg.

FIGS. 4A to 4F illustrate an embodiment of a method to install a shim assembly load cell on a support member of a structure, where FIG. 4A illustrates fixing the base support to the concrete by using an existing bolt, FIGS. 4B1 and 4B2 illustrate attaching the load cell to the support element of the structure, FIG. 4C illustrates installing the "n" shape lifting device over the load cell and lifting the load cell a few millimetres above the ground, FIG. 4D illustrates inserting a shim under on the base support and under the load cell, FIG. 4E illustrates removing the lifting device and FIG. 4F illustrates fastening or attaching the load cell to the load cell base.

FIG. 5A is a front perspective view of another embodiment of an apparatus to weight and monitor weight of a structure and its content using a S-type load cell adapter assembly in accordance with the principles of the present invention.

FIG. 5A1 is a perspective view of the apparatus to weight and monitor weight of a structure and its content of FIG. 5A shown without the support member of the structure.

FIG. 5B is a front perspective view of the apparatus of FIG. 5A shown with lifting tools having the support member in a lifted position.

DETAILED DESCRIPTION OF THE PREFERRED EMBODIMENT

Figure 2A:
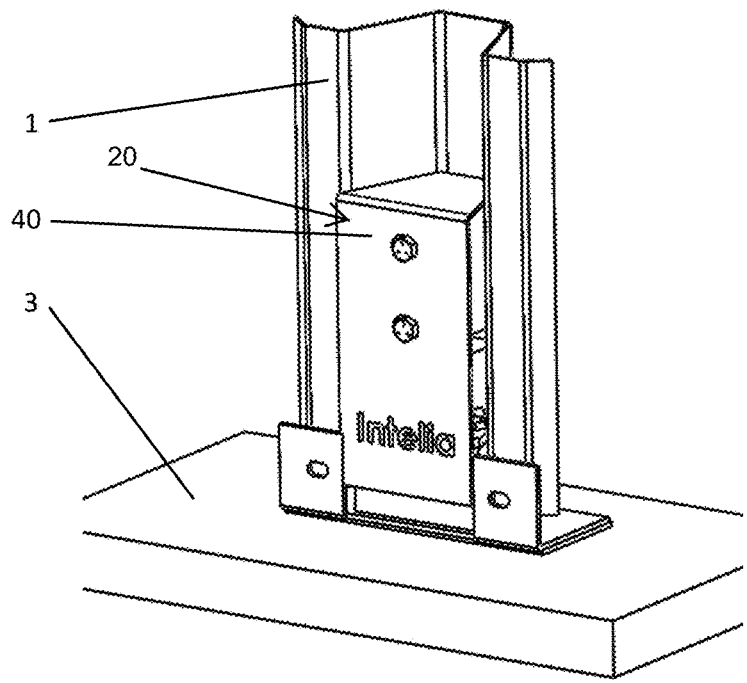
FIG. 2A is a front perspective view of an embodiment of an apparatus to monitor the weight of the structure and its contents in accordance with the principles of the present invention.

A novel method and apparatus to monitor the material weight contained or weight of a reservoir, a tank, a silo or any other types of structures will be described hereinafter.

Although the invention is described in terms of specific illustrative embodiment, it is to be understood that the embodiment described herein are by way of example only and that the scope of the invention is not intended to be limited thereby.

Thus, for example, any sequence(s) and/or temporal order of steps of various processes or methods that are described herein are illustrative and not restrictive.

Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." When used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

In some embodiments, the method and apparatus may be provided to monitor the material weight contained in a reservoir. The material could be liquid or solid or a mixed of liquid and solid.

The present invention is herein described as a device for monitoring and/or weighting content of a reservoir or a silo. One skilled in the art shall understand that the present device and method may be adapted to monitor, weight and/or lift other structures without departing from the principles of the present invention. As examples, the structures may be a system for weighting animals or animal food, transition hopper or other structures in which it may be required to weight the content or the structure itself.

The present system generally allows weighing the contents of the reservoir by using compact load cell assembly without exceeding the footprint of the original support member of the reservoir.

Referring first to FIGS. 1A and 1B, a standard "W shape" prior art support member of a structure, such as a reservoir, being mounted to the ground without any weighing system is shown. In such typical prior art device, two overlapping metal sheets 2 form a base support fixed and/or anchored to the ground 3 using a concrete wedge anchor bolt 4. The support member 1 of the structure being attached to the ground leg anchor 2 of the support member 1 is mounted to the ground 3. In such prior art system, one wedge anchor bolt 4 passes through each metal sheet of the ground leg anchor 2 to anchor the structure in the ground.

Now referring to FIGS. 2A and 5A, different embodiments of system to monitor and weight structure 21 are shown. Such embodiments generally use a small and compatible footprint of a standard "W shape" support member 1 of a structure making possible the installation of the weighing system even when the structure is mounted on reduced areas, such as small concrete blocks. Referring now to FIG. 2A, an embodiment of the system 21 is shown. The system 21 is inserted in the "W" shaped support member 1 on a ground surface 3.

Figure 2B:
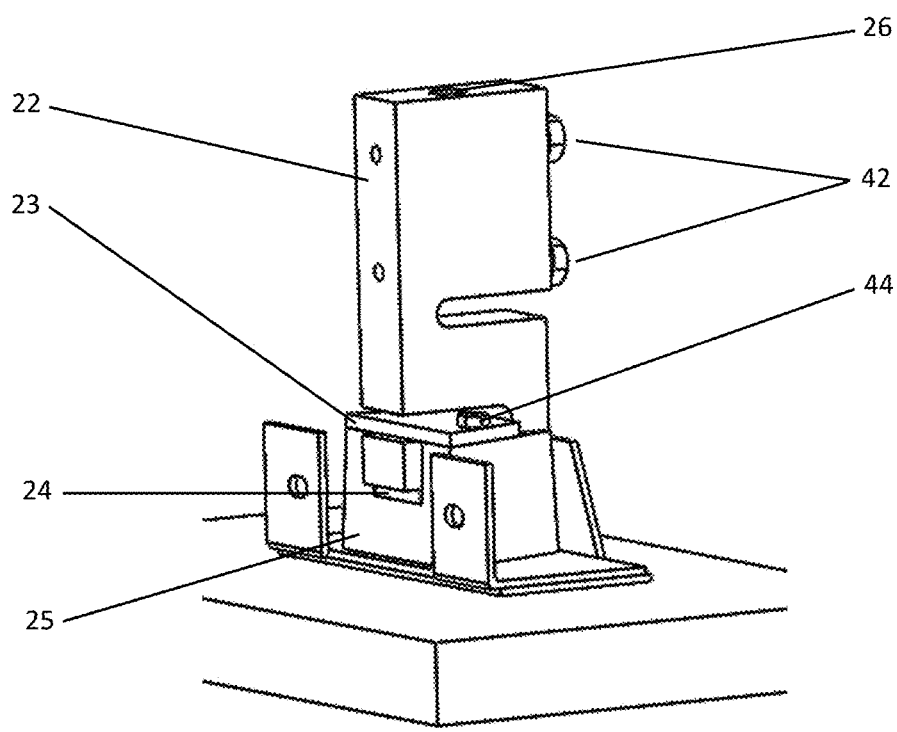
FIG. 2B is a side perspective view of the apparatus to monitor the weight of the structure FIG. 2A and its content, the structure being shown in a lifted position without the load cell cover and without the supporting member of the structure in accordance with the principles of the present invention.

Referring now to FIGS. 2A-2E, an embodiment of the system 21 is illustrated. Also referring to FIGS. 3A-3C, parts of a system 21 or monitoring weight contained in a structure and/or weight of the structure itself is illustrated. Referring first to FIGS. 2A and 2B, the system 21 broadly comprises a load cell 22 attached to the support member 1 of a structure, such as a reservoir. The system 21 may further comprises a base solidly fixed to the ground 3. Understandably, the ground leg anchor plates 2 of the structure may be any type of mounting base and may be absent without affecting the operation of the system 21. Also, the ground leg anchor plates 2 may already be installed with the structure such as a reservoir.

In some embodiments, the system 21 may comprise a cover or casing 40 covering the load cell 22. The cover 40 may cover the system 21 (see FIGS. 2A and 3C) over the top and/or other exposed sides or areas of the weighing system. In some embodiments, the cover 40 may be a rigid shield. The cover 40 may also protect the load cell 22 against direct sunlight and reduces the temperature rise which may affect the accuracy of readings due to the lengthening of the load cell material.

Referring now to FIG. 2B, the system 21 without the cover 40, is shown without the support member 1 of the structure. In such embodiment, the load cell 22 is supported by a load cell base 25. The load cell 22 may have a general 'S' shape.

Figure 3A:
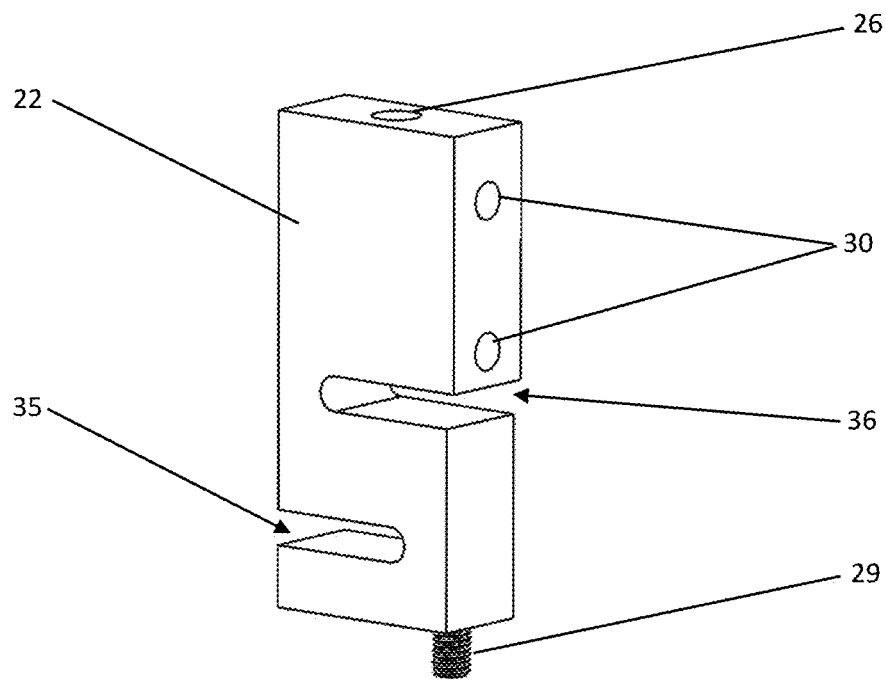
FIG. 3A is perspective side view of an embodiment of a load cell having built-in apertures for support member fastener and lifting facility used with the apparatus to monitor the weight of the structure of FIGS. 2C to 2D and its content.

Referring now to FIG. 3A, an embodiment of a load cell 22 is shown. The load cell 22 is generally formed with two recesses or openings 35 and 36. The openings 35 and 36 generally allow deformation of the load cell 22 when a downward force is applied in compression. The load cell 22 may comprise a locking system 29 such as a pin, restricting lateral displacement of the load cell 22 in the load cell base 25. Understandably, any other type of locking method may be used within the scope of the present disclosure. The load cell 22 may further comprise a lifting anchoring element 26 adapted to be raised or lowered by a lifting device 26, such as a threaded aperture. The load cell 22 may further comprise threaded apertures 30 to attach the load cell to the support element 1.

In such an embodiment, the load cell base 25 may form a footprint shaped as a trapeze. The supporting members being shaped as "W" and the trapeze shape of the load cell base 25 may be adapted to fit inside or outside of the supporting member. Understandably, the support elements may have other shaped and thus the load cell base 25 may be shaped accordingly in order to fit within the support member shape.

Figure 3B:
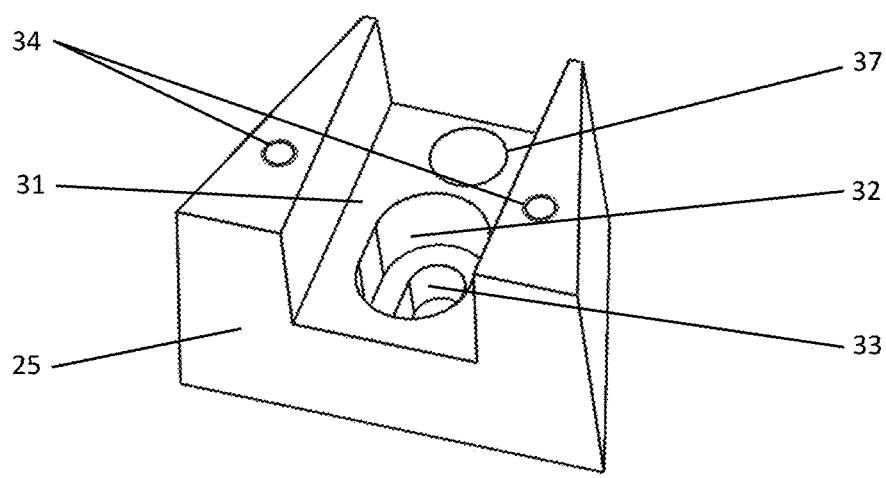
FIG. 3B is a perspective side view of an embodiment of a load cell base used with the apparatus to monitor the weight of the structure of FIGS. 2A to 2D and its content.

Referring now to FIG. 3B, the load cell support or base 25 is shown. In some embodiments, the load cell base 25 may comprise a cavity 31. In a preferred embodiment, the cavity 31 is generally shaped to receive the bottom portion of the load cell 22 or to receive or seat some portion or the entire load cell 22 or 51. Generally, the cavity 31 restricts lateral displacement or torsion of the load cell 22 and consequently of the support member 1 attached to the load cell 22.

In some embodiments, the load cell base 25 may comprise concentric openings 32 and 33 arranged to form a seat allowing the base to be securely restrained to the ground by any fastener 4 such as, but not limited to a concrete anchor, nut or bolt. In yet other embodiments, the depth of the opening 32 and 33 is high enough to clear the top of the anchor 4 below the cavity 31, thus aiming at avoiding mechanical conflict with the load cell 22 and 51 and/or the shimming mechanism 24. Such an opening 33 may be oblong. The oblong shape generally aims at ensuring positioning of the load cell base 25 in or 10 near the center of the support member 1 even when the anchor on the ground 4 is not perfectly aligned with the center of the support member 1. The passage 32 may be adapted to reuse standard anchor bolt 4 to secure the load cell base 25 to the ground. The depth of the oblong hole 32 may be adapted to clear the threading head and the nut of the anchor 29 at the level where the load cell 22 and 51 or the shimming mechanism 24 is positioned 31. Understandably, the opening 33 may have any other shape suited to receive and/or position the load cell base 25.

Figure 4C:
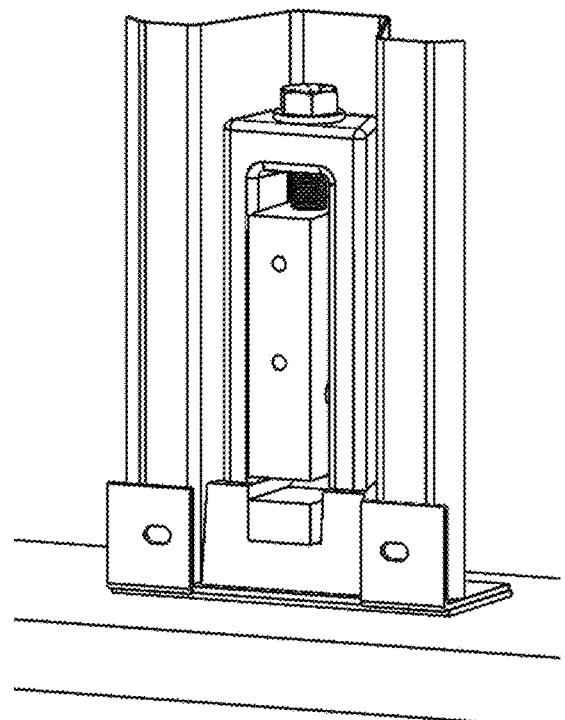
Figure 7A:
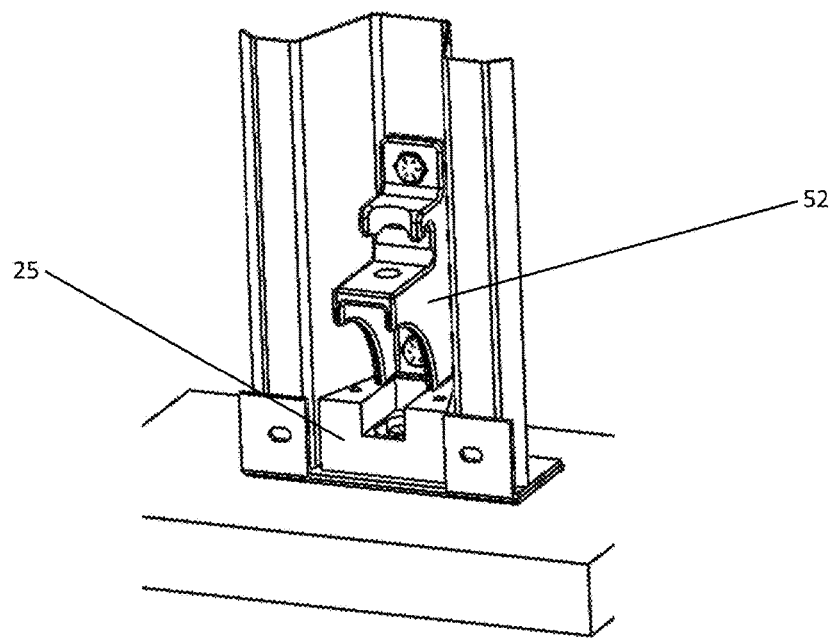
FIG. 7A is a perspective front view of an embodiment of an S-type adapter attached to a support member of a structure and a load cell base in accordance with the principles of the present invention.
Figure 7B:
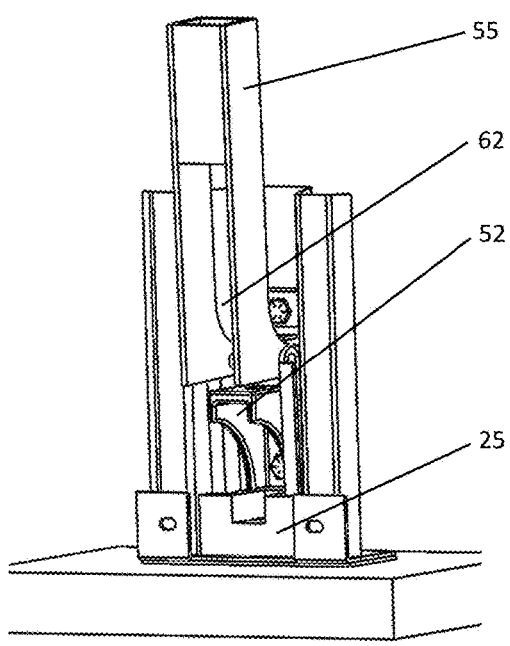
FIG. 7B is a perspective front view of an embodiment of a lifting device installed on the S-type load cell adapter of FIG. 7A, the lifting device being shown while the load cell adapter and the reservoir support member are in a lowered position in accordance with the principles of the present invention.
Figure 7C:
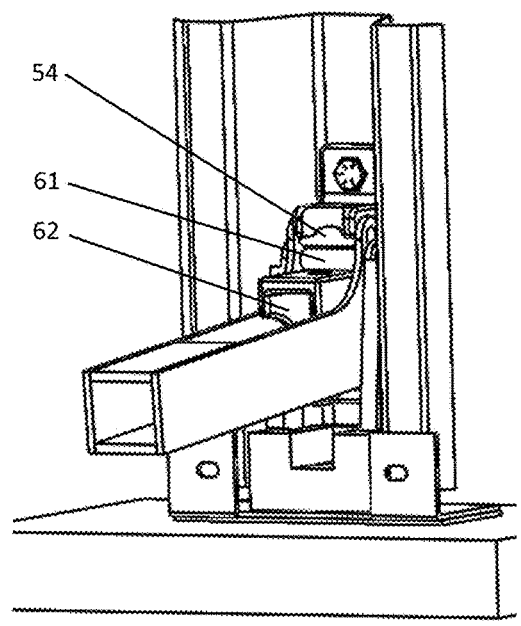
FIG. 7C is a perspective front view of an embodiment of the lifting device installation on the S-type load cell adapter of FIG. 7A, the lifting device being shown while the load cell adapter and the reservoir support member are in lifted position and ready for insertion of the S-type load cell in accordance with the principles of the present invention.

The load cell base 25 may be "V-shaped". Such V-shape allows the installation of a load cell 22 and 51 inside of a "W-shaped" support member 1, as shown in FIG. 4C or 7A.

The load cell base 25 may further comprise apertures 34 such as threaded holes adapted to receive and fix a retaining plate 23. Such retaining plate 23 generally keeps the load cell 22 and 51 captive inside of the cavity 31 by limiting the upward movement of the load cell 22 and 51.

The load cell base 25 may further have a thickness adapted to increase rigidity of the said base 25. The increased thickness generally aims at optimizing the seating of the shimming mechanism 24 and of the load cell 22 on a top portion 31 of the load cell base 25. The top portion 31 is generally planar aiming at generally and evenly distributing the load about the said surface 31 and aiming at maximizing the accuracy and the repeatability of the load cell 22 readings.

Referring now to FIG. 2C, the load cell 22 is shown being attached to the removable lifting device 27. As an example, the load cell 22 may be attached to the support member using fasteners 42 mounted to the load cell 22 through the support member 1 and the apertures 30. A removable lifting mechanism 27 is adapted to pull up or raise the load cell 22 attached to the support structure 1.

Figure 3C:
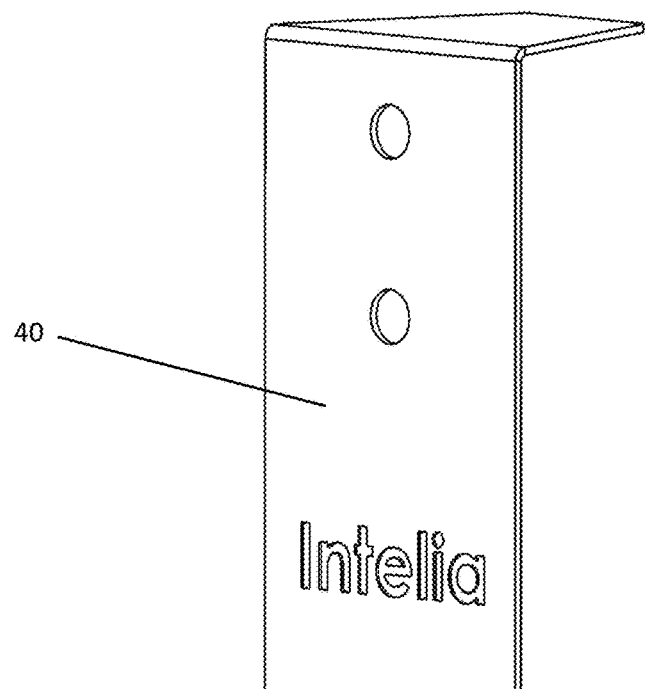
FIG. 3C is perspective side view of an embodiment of a cover of the apparatus to monitor the weight a structure and its content.

Now referring to FIG. 3C, a cover 40 for the system 21 is illustrated. In some embodiments, the system 21 may be protected by a cover 40 installed over the system 21. In some embodiments, the cover 40 is made of rigid material. The cover 40 may be shaped as an "L" to protect the side portion of the system 21 and the top portion of the system 21.

The cover may also protect the load cell 22 against direct sunlight and reduces the temperature rise which may affect the accuracy of readings due to the lengthening of the load cell material.

Figure 3D:
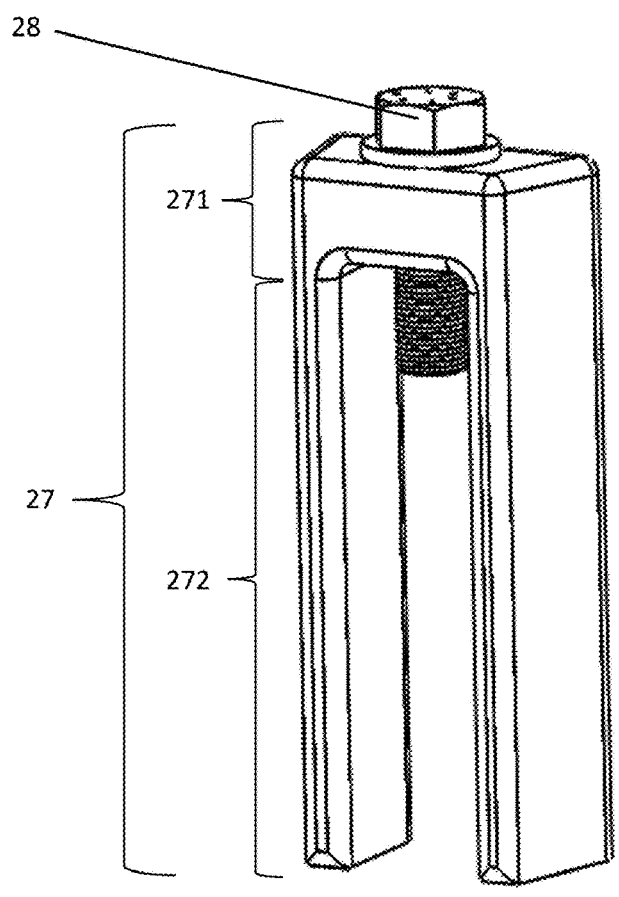
FIG. 3D is perspective side view of an embodiment of a bridge support or 'n' shaped lifting device with the apparatus to monitor the weight a structure of FIGS. 2C to 2D and its content.

In the present embodiment, the lifting mechanism 27 may be removable. As shown in FIG. 3D, the removable lifting mechanism 27 comprises a top portion 271, a lifting element 28 and leg portions 272. The lifting mechanism 27 is preferably made with strong material to support weight of the support member while limiting the deformation of the lifting mechanism 27. The lifting mechanism 27 may also comprise a lifting element 28. The lifting element 28 may be embodied as a thread bolt adapted to be received by an anchoring element 26 as such a mating threaded hole 26 located on the top portion of the load cell 22, as shown in FIG. 3A.

The lifting mechanism 27 may be embodied as a 'n' shape support member 27 having a bolt 28 on top. In some embodiments, the top of the load cell 22 is approximatively spaced by one inch from the lifting device when standing on the load cell base. In some embodiments, to raise the load cell 22 and the support member 1 attached to the structure, the bolt 28 is turned into the threaded hole 26 of the load cell head.

In yet other embodiments, the lifting mechanism 27 is shaped as bridge between on side of the load cell base 25 and the other side of the load cell base 25. In such embodiments, the bridge-shaped lifting mechanism 27 creates a rigid connection between both sided of the load cell base 25.

As an example, by turning the bolt in a first direction, such as clockwise, the bolt head 28 will be retained by the top of the lifting device. At such a moment, the load cell 22 is lifted from the load cell base 25. Upon lifting the load cell 22 to clear the thickness of a shimming mechanism 24 at the load cell base, the shimming mechanism 24 nay be inserted or placed in the load cell base cavity 31 under the load cell 22. After placing the shimming mechanism 24, by turning the bolt in an opposite direction, such as counter clockwise, the load cell 22 is lowered as the tension of the bolt is released. Once the load cell 22 is fully supported by the shim 24, the lifting device may be removed.

Referring to the previously described steps, when such steps are executed in the reverse order, the shimming mechanism 24 and the weight applied on the load cell 22 may be removed.

The lifting mechanism 27 may also comprise attachment means under each leg 272. The attachment means are adapted to be attached or mounted to the support base 2.

The anchoring element 26 is typically made of rigid material and generally aims at continuously maintaining a rigid connection with the supporting member 1 of the structure during the lifting operation. Once the lifting operation is completed, the lifting device may be removed. The lifting device being removed, the load cell 22 is rigidly maintained to the ground or to a solid structure using the load cell base 25 and the upward locking member 23.

Now referring to FIG. 2D, the lifting mechanism 27 is shown in a lifted position. In that specific embodiment, when bolt is tightened, the load cell 22 is pulled toward the top portion of the lifting mechanism 27, therefore lifting the load cell 22 and the attached support member 1.

Once installed, the load cell 22 is vertically held to the base 25 of the load cell 22 using any locking member. In some embodiments, the upward locking member may be a flat plate 23 covering the lowest opening of the load cell 22 and attached on each side to the load cell base 25. The flat plate 23 may be attached using fastener 44 using the threaded apertures 34.

When the weighing system is installed in the dirty or cold area, the opening 35, 36 in the load cell can be obstructed by agglomerated matter such as dust, sand, gravel, ice which may limit the free bending of the load cell and distort the measurement process. To prevent such accumulations in the load cell opening 35, 36, the openings 35 and 36 may be filled or at least partially filled with watertight, low compression resistance and very flexible material such as silicone and soft rubber.

The weight of the structure applied to the support member is transferred and read by the load cell when the load cell holds the support member above the ground. In such embodiments, when the load cell is attached to the support member, the load cell 22 is compressed by the weight of the structure by adding a shimming mechanism under the load cell 22 which holds the assembly together above of the ground.

The load cell 22 may output a proportional signal from the load applied by the structure to the support member of the structure 1 as soon as the load cell 22 is no longer retained by the lifting mechanism 27 and resting on the shimming mechanism.

Now referring to the FIG. 4A to 4F, an embodiment of a method to install a load cell is illustrated. Referring to FIG. 4A, the method comprises attaching the load cell base 25 support to a solid surface, such as concrete, using bolts or any other fasteners, such as the existing bolts in the solid surface as illustrated in the FIG. 4A. Referring now to FIGS. 4B1 and 4B2, the method further comprises placing the load cell 22 in the cavity 31 of the base 25 and then attaching the load cell 22 to the support element 1 of the structure.

Referring now to FIG. 4C, the method further comprises positioning the lifting mechanism 27 to be supported by the load cell base 25. The method may further comprise engaging the bolt 28 with the top portion of the load cell 22. Now referring to FIGS. 4C and 4D, the method comprises lifting the load cell 22 and the support element 1 of the structure by using a temporary lifting device or mechanism 27. The lifting creates a space or clearance between the load cell 22 and the surface of the cavity 31 of the load cell base 25.

Figure 4D:
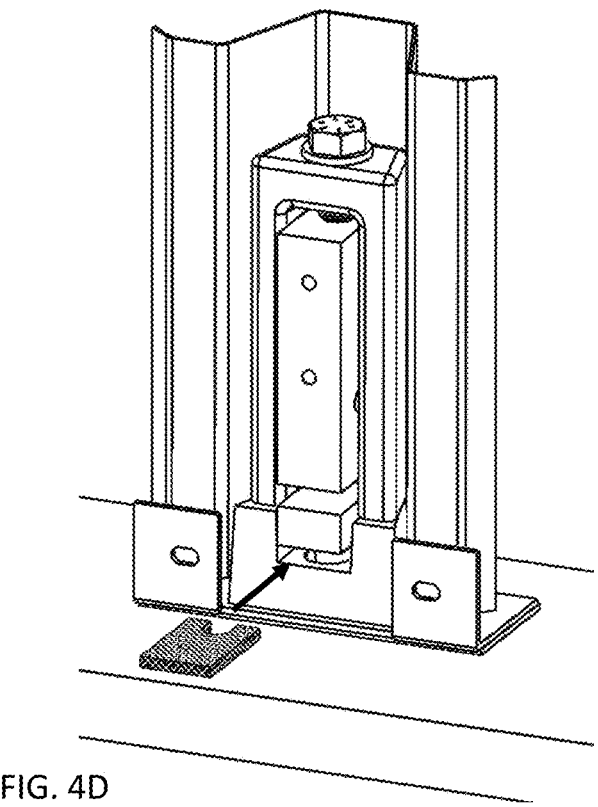
Figure 4E:
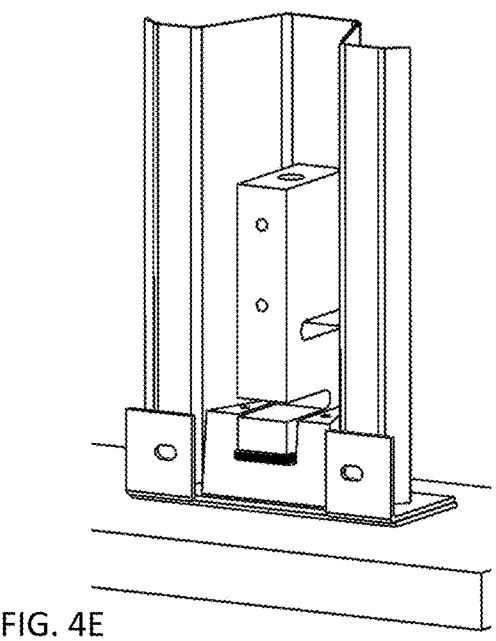
Figure 4F:
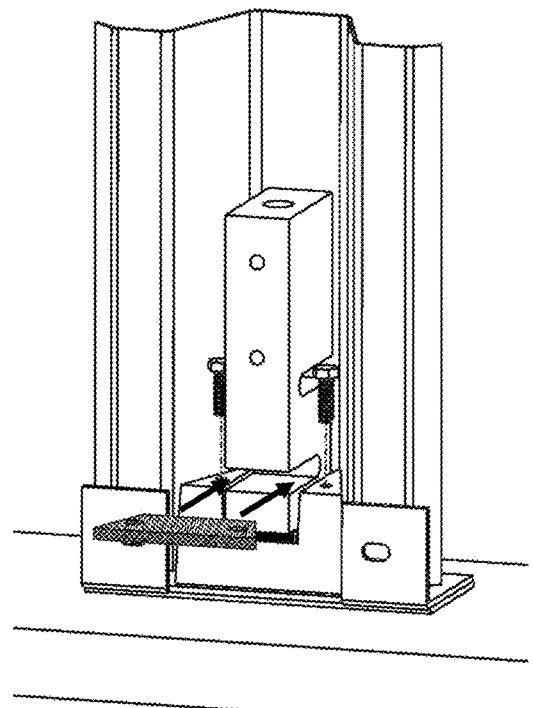

Referring to FIGS. 4D and 4E, the method may further comprise inserting a shimming mechanism 24 between the load cell 22 and the surface of the cavity 31 of the load cell base 25. The method may further comprise removing the lifting device 27 as shown in FIG. 4E. As shown in FIG. 4F, the method may further comprise fastening, attaching or fixing a retaining plate 23, retaining plate 23 generally keeping the load cell 22 captive inside of the cavity 31. The method may further comprise covering the system, such as using a cover 40 to protect the weight system (not shown).

In other embodiments, the load cell 22 be designed not to be directly attached to the support member 1 of the reservoir. In such embodiments, a load cell adapter may be required as shown in FIG. 5A.

Referring to FIGS. 5A and 5A1, another embodiment of a load cell assembly is illustrated. Such an embodiment of the load cell assembly 50 generally aims at using a small and compatible footprint of a standard "S-type" load cell 51. Such compact load cell assembly 50 used has a reduced footprint may allow installing the weighing system in a standard "W shape" member 1 of the reservoir. Such system 50 may be useful when the reservoir is mounted on a few or small concrete blocks. In such of embodiment, the weight applied on the supporting member 1 is transferred to the load cell adapter 52. A load cell 51, such as a standard "s-type", may be compressed between a load cell base 25 and a load cell adapter 52 to output a proportional signal of the weight applied by supporting member 1 of the reservoir.

In such an embodiment, the load cell base 25 may be shaped and may comprise features such as the base illustrated at FIG. 3B. The load cell base 25 may be solidly attached to the ground using, as an example, an anchor wedge bolt into an opening with a shoulder. Understandably, any other method to attach the load cell base 25 to the ground or to a structure may be used within the context of the present invention.

Figure 5C:
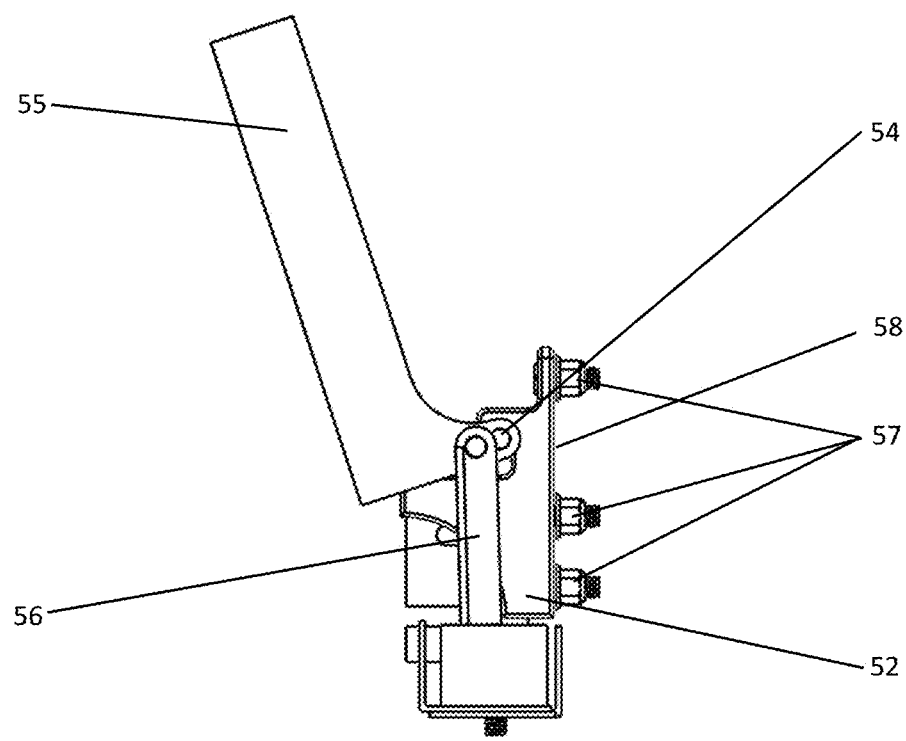
FIG. 5C is a side view of the apparatus of FIG. 5A shown with lifting tools having the support member in a lowered position.
Figure 5D:
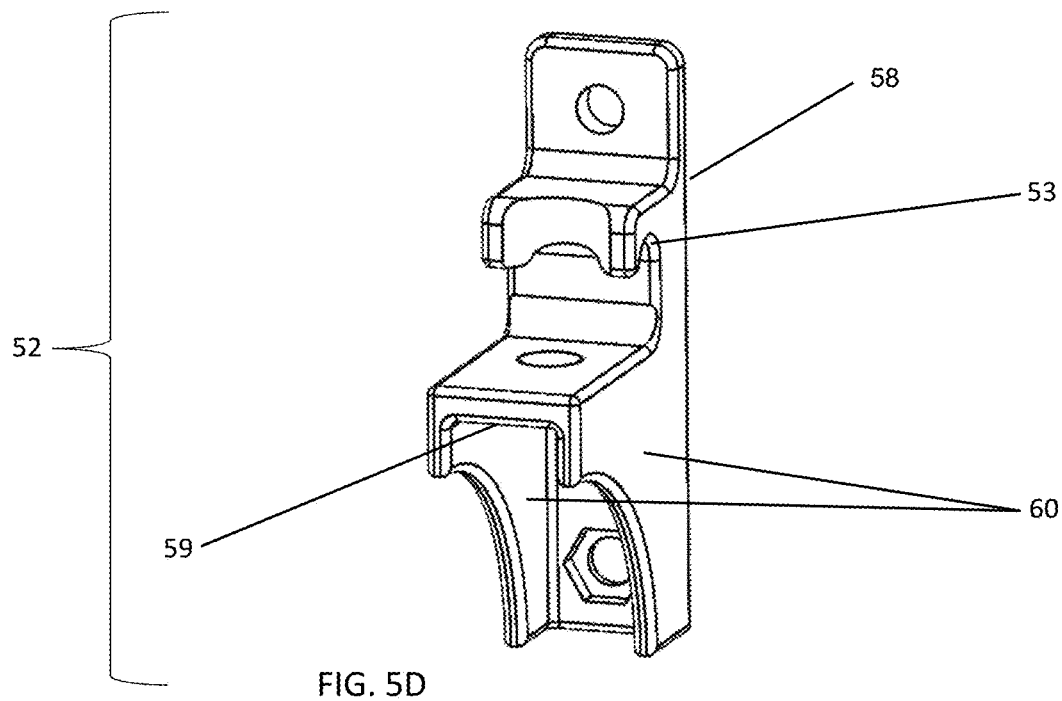
FIG. 5D is a front perspective view of an embodiment of a S-type load cell adapter of the apparatus of FIG. 5A used to support the support member of the structure in accordance with the principles of the present invention.

Now referring to FIG. 5D, an embodiment of a load cell adapter 52 is illustrated. The load cell adapter 52 may comprise a back surface 58 adapted to be mounted to the support member 1 of the structure.

In some embodiments, the back surface 58 may be adapted to receive one or more fasteners 57 to firmly attach the load cell adapter 52 to the support member 1 of the structure.

The load cell adapter 52 may further comprise a load cell top seat 59 adapted to transfer the load of a support member 1 to a compression load cell 51 such as a standard "S-type" load cell. The top portion 59 of the load cell seat may also comprise one or many holes to maintain a load cell 51 in place in the load cell adapter 52 using a fastening means such as a bolt or locking pin. Optionally, the load cell adapter 52 may comprise one or more side walls 60 generally aiming at increasing the rigidity of the adapter and at protecting the load cell 51 against shocks and others unwanted elements and/or at increasing the stability when lateral force is applied, such as but not limited to wind.

In such an embodiment, the load cell adapter 52 may be attached to the support member 1 of the reservoir, typically above the load cell base 25. In some embodiments, the distance between the load cell top seat 59 of the adapter 52 and the seat of the cavity 31 of the load cell base 25 should be few millimetres less than the height of a load cell to be inserted in order the load applied by the support member 1 may compress the load cell.

The load cell adapter 52 may further comprise an anchoring element 53 to attach any lifting mechanism 55 during the lifting operation.

In such an embodiment, the adapter 52 is attached to the supporting member of the reservoir. To insert the load cell between the base 25 and the top seat of the adapter 59, the adapter 52 may be lifted. Referring to FIGS. 5B and 5C, a method to lift the adapter 52 attached to the reservoir support member is shown. The method comprises using a lever tool 70 to induce upward movement. In some embodiments, the lever tool 70 may comprise a support member 56 pressing the base 25 and a grip pin 54 attached to the anchoring element 53 of the adapter 52.

In some embodiments, the method to lift the adapter 52 may comprise inserting the grip pin 54 in the anchor facility 53 of the adapter 52 and placing each lever support member 56 on the base 25 while the handle 55 is in upper position. The method may further comprise downwardly pivoting the handle 55 about a center axis, the center axis being around the grip pin 54 inserted in the anchor facility 53. Upon such pivoting of the handle 55, the tool separates the base 25 and the grip pin 54 and leaving enough space to insert the load cell 51. The geometry of the pivots of the lever provides a zero force when the handle is at the lower position to effortlessly install the load cell 51. Once the load cell 51 is inserted, the handle 55 may be upwardly moved closes the space between the base 25 and the grip pin 54, the load cell 51 is thus put in compression. The lever tool 70 may be released at the upper position.

Figure 6A:
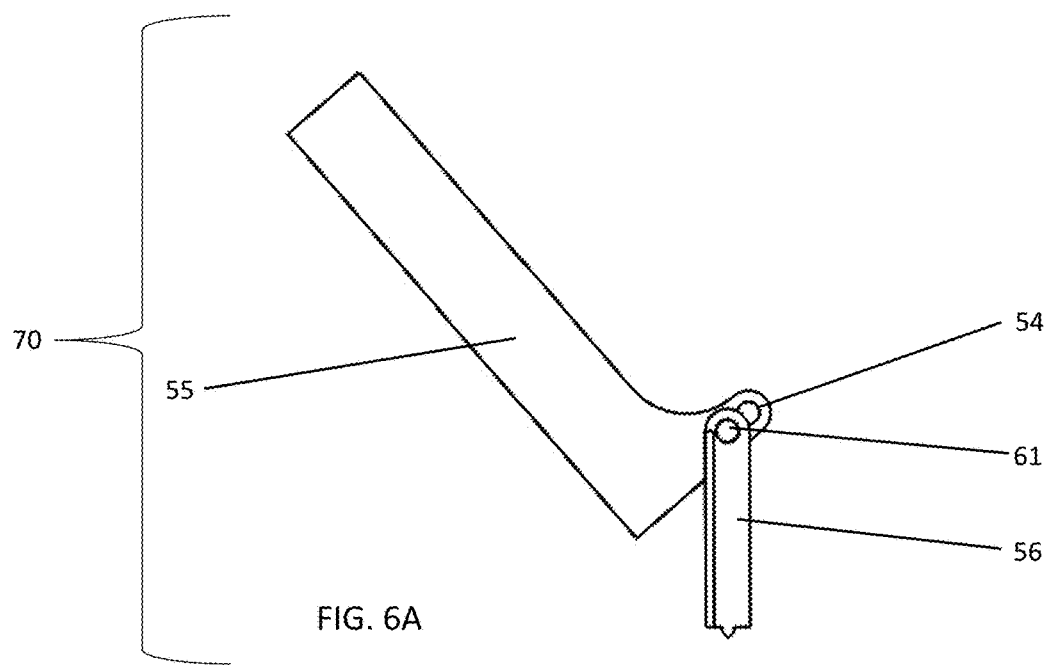
FIG. 6A is a side plan view of an embodiment of a lifting system in lowered position comprising a pivoting handle in accordance with the principles of the present invention.
Figure 6B:
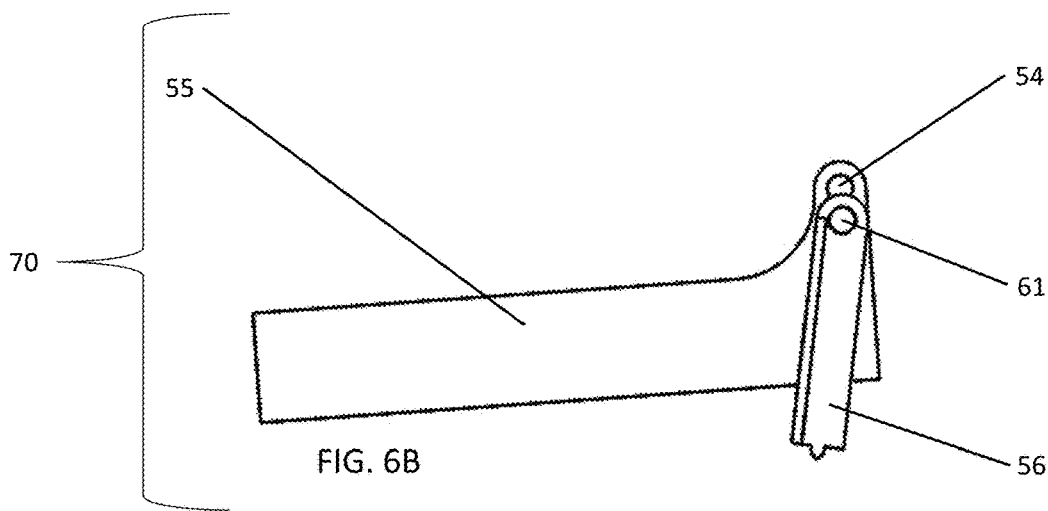
FIG. 6B is a side plan view of the lifting system in lifted position of FIG. 6A shown with the handle being lowered.
Figure 6C:
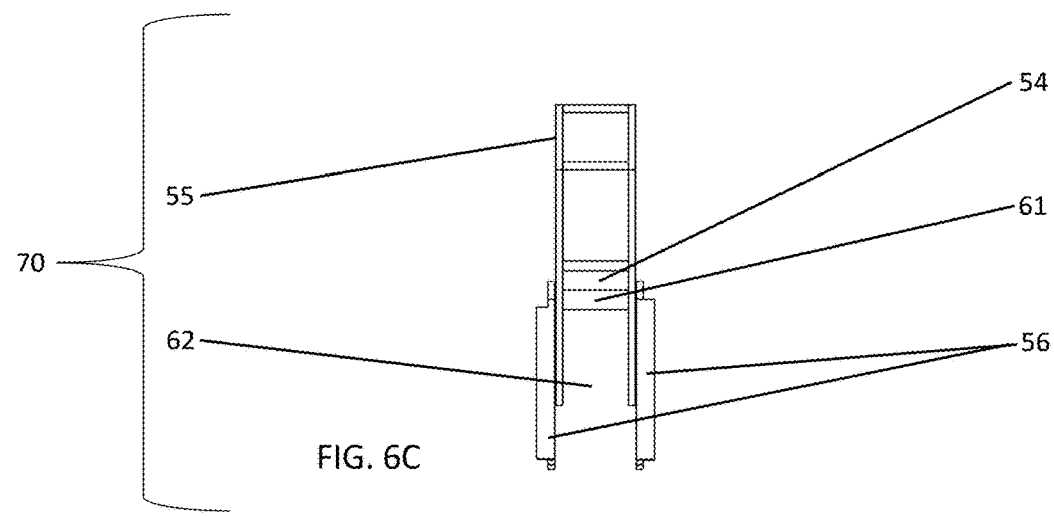
FIG. 6C is a front view of the lifting system of FIG. 6A shown in a lowered position with the handle being in raised position.

Now referring to FIGS. 6A to 6C, the lever support members 56 are typically linked by a shaft or any connecting member 61 which may allow pivoting of the lever support members 56. Thus, when the handle 55 is pivotally lowered, a portion of the handle 55 may push against the shaft 61 connecting the lever support members 56, thus upwardly pushing the supporting member by a few millimeters (see FIG. 6B). By pivoting the handle 55 upwardly, the pressure against the shaft is released and the support member are moved down on the inserted load cell 51 (see FIG. 6B).

In some embodiments, as shown in FIG. 5B, 6C, 7B or 7C, the handle 55 may comprise an open portion 62 allowing the insertion or the removal of the load cell 51 while the handle 55 is lowered.

Now referring to FIG. 7A, the space between the adapter 52 and the base 25 is few millimeters lower than the height of the load cell 51 to maintain an inserted load cell in compression.

Understandably, the grip pin 54 may be replaced with any other type of fastener to comply with other type of anchor facility in such a way that it can be used with other embodiments of the weighing system.

In some embodiments, the method may further comprise adding a permanent protecting soft material to avoid any perturbing elements affecting free movement of the structure support member, such as but not limited to snow, ice, grain, animal feed, gravel. Such perturbing elements may get lodged in free space left between the structure support member and the ground while the weight of the reservoir is fully supported by the load cell 22 or 51. The protecting material may have mechanical properties allowing many compressions and expansions while maintaining its original volume. As an example, the protecting material may be made of silicon. The protecting material may also have a very weak compression resistance which is not affecting the normal compression to the load cell by the load applied by the reservoir.

Figure 8A:
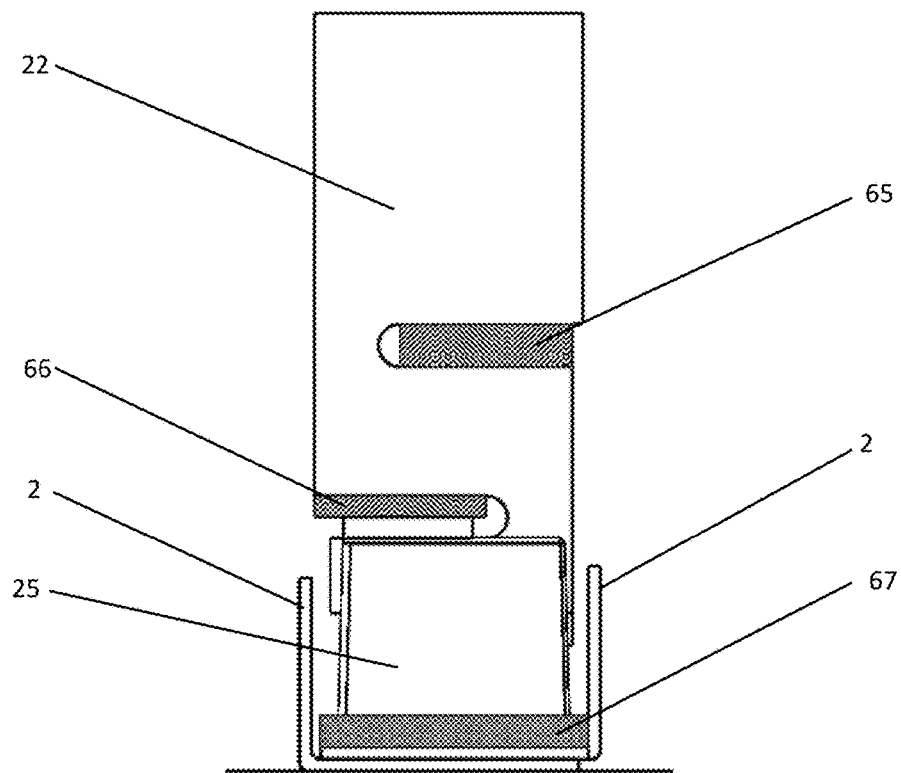
FIG. 8A to 8B are perspective rear views of protecting material inserted within the S-type load cell and below a support member of the structure.
Figure 8B:
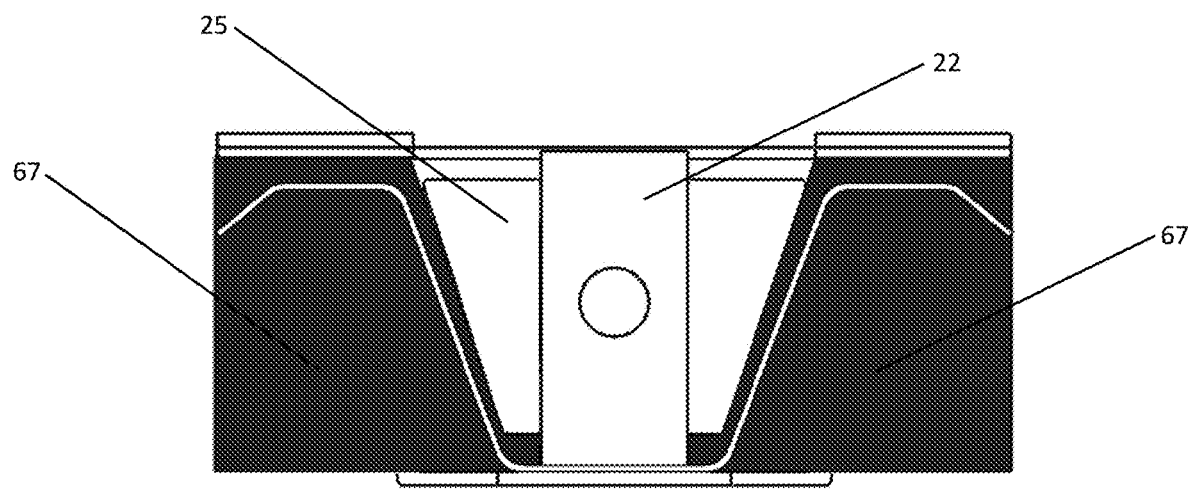

Referring now to FIGS. 8A and 8B, an embodiment of the protecting material inserted in the aperture 65 and 66 of the load cell such as a "s-type" model is shown.

Referring to the FIG. 8A to 8D, the protection material 67 may be inserted below the support member 1 of the structure once the support member 1 has been lifted and is maintained in lifted position by a load cell 22 or 51.

Figure 8C:
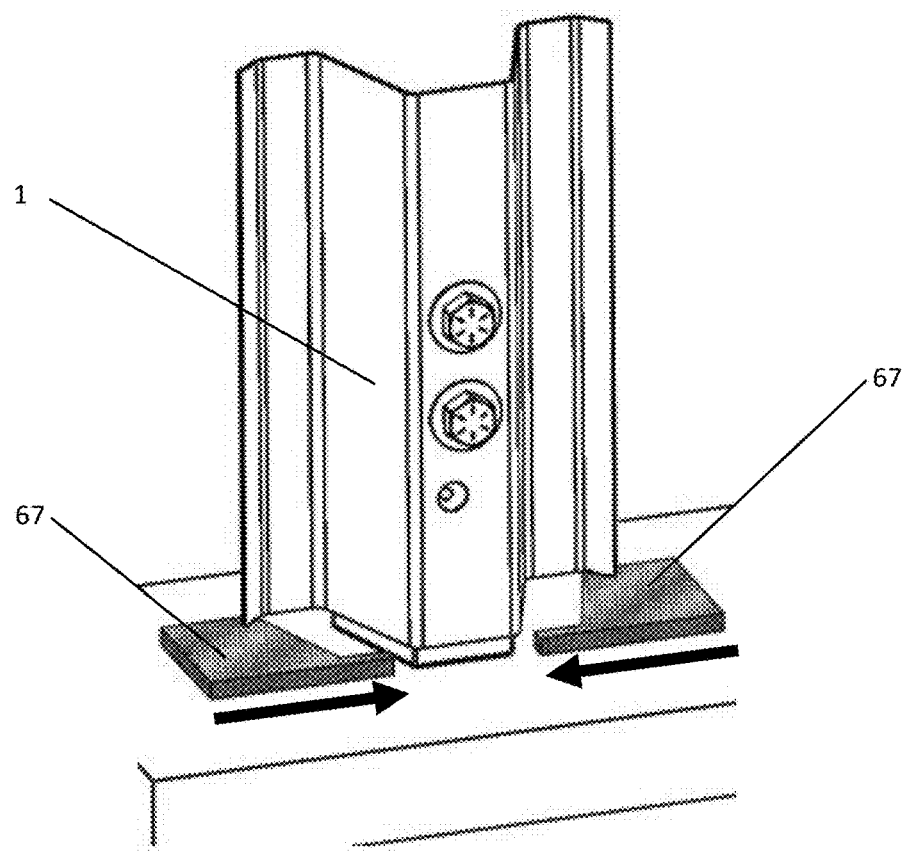
FIG. 8C is a simplified side view of the load cell assembly comprising protecting material inserted inside of load cell apertures.
Figure 8D:
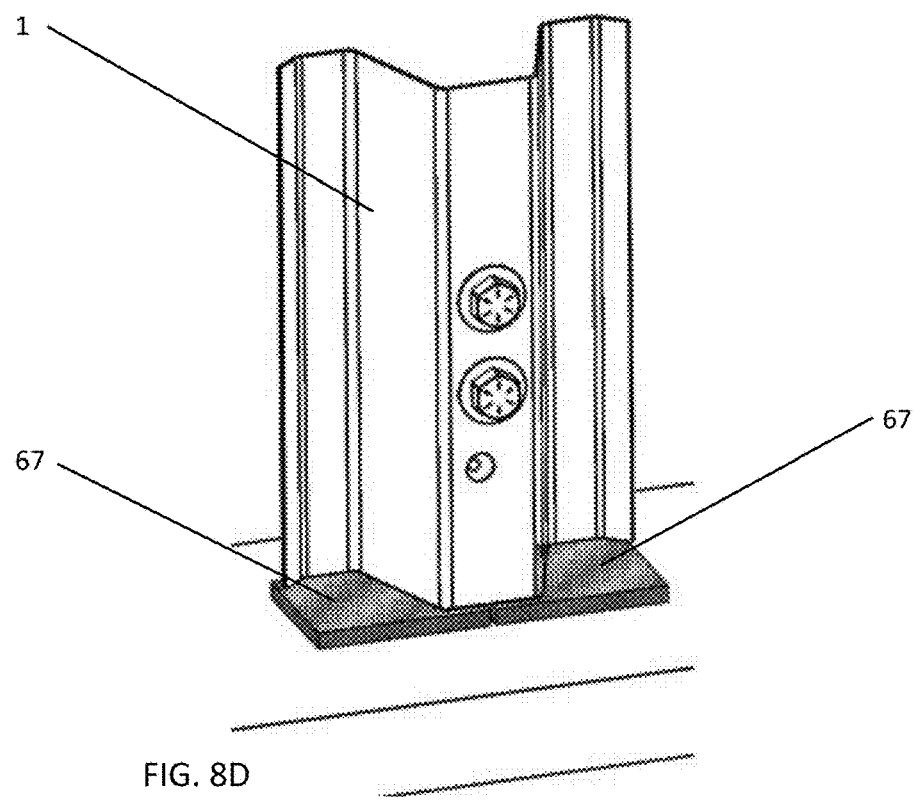
FIG. 8D is a simplified top view of the load cell assembly inside of the support member of the structure comprising the protecting material inserted below the support member of the structure.

Now referring to the FIGS. 8C and 8D, a method to insert the protection material below the support member may further comprise applying, inserting or sliding one or many pieces of protecting material below the support member once the support member has been lifted. While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system to measure the weight applied on a rigid surface by a supporting member of a structure, the system comprising:
   a compression load cell assembly comprising:
      a side mount fastener attaching a side portion of the compression load cell assembly to a side portion of the supporting member of the structure;
      a rigid base adapted to vertically support the compression load cell assembly;

a deformation zone between the side mount fastener and the rigid base, the deformation zone comprising a deformation measurement sensor measuring the load supported by the side mount fastener;

a shim insertable between the compression load cell assembly and a load cell assembly base;

wherein the compression load cell assembly is compressed by the weight applied by the supporting member when the shim is inserted and maintains the supporting member at an elevation above the rigid surface;

the compression load cell assembly base being:
    shaped to support and hold the rigid base of the load cell assembly and the shim;
    attachable to the rigid surface.

2. The system of claim 1, the load cell assembly further comprising an anchoring element attachable to a lifting device, the lifting device being adapted to lift the load of the supporting member.

3. The system of claim 2, the anchoring element comprising a linking element adapted to mate with the anchoring element, the lifting device being adapted to raise and lower the supporting member attached to the load cell assembly.

4. The system of claim 3, the lifting device being removable.

5. The system of claim 3, the lifting device being further adapted to lift the load cell assembly to allow the insertion or removal of the shim under the load cell assembly.

6. The system of claim 3, the lifting device further comprising:
    a) a rigid structure forming a bridge over the load cell assembly, the rigid structure being supported on the load cell assembly base on each side of the load cell assembly;
    b) a lifting member adapted to be attached yet detachable to the lifting device, the lifting member being adapted to raise and lower the load cell assembly within the bridge structure.

7. The system of claim 1, the supporting member being shaped as "W" and a trapeze shape of the load cell assembly base being adapted to fit inside or outside of the supporting member.

8. The system of claim 1, the load cell base comprising an aperture adapted to be aligned and to mate with a fastening element of the rigid surface.

9. The system of claim 1, the system comprising a retaining plate adapted to be mounted to the load cell base and to limit the upward movement of the load cell assembly.

10. The system of claim 1, the system comprising a soft protecting material inserted in apertures of the load cell assembly.

11. The system of claim 1, the system comprising a soft protecting material below the supporting member.

12. The system of claim 1, the load cell assembly base comprising a counterbore adapted to contain a fastener attaching the load cell assembly base to the rigid surface and being adapted to support the rigid base of the load cell assembly over the counterbore.

13. The system of claim 12, the load cell assembly base comprising a recess adapted to receive the rigid base of the load cell assembly and the shim.

14. A system to measure the weight applied on a rigid surface by a structure comprising a plurality of supporting members supported by a rigid surface, each of the supporting members having a system to measure the weight of a supporting member according to claim 1.

15. A method for installing a weighting system to a supporting member of a structure, the method comprising:
    attaching a load cell base to the rigid surface;
    seating a first portion of a load cell below a deformation measurement sensor of the compression load cell on the load cell base;
    attaching a second portion of the compression load cell over the deformation measurement sensor to a side portion of the supporting member;
    lifting the load cell attached to the supporting member;
    when the load cell is raised, inserting a shim between the compression load cell and the load cell base;
    lowering the lifted load cell until the load cell seats on the shim to compress the compression load cell with the weight applied by the supporting member.

16. The method of claim 15, the method further comprising removing the lifting device.

17. The method of claim 15, the method further comprising inserting a soft protecting material below the supporting member of the lifted supporting member or in one or more aperture of the load cell.

18. The method of claim 15, lifting the load cell further comprising:
    operatively connecting a lifting device to the load cell;
    supporting the lifting device on the load cell base; and
    the lifting device raising the load cell.

19. A method for measuring the weight applied on a rigid surface by a structure having a plurality of supporting members comprising executing the method of claim 15 for each of the supporting members.

20. A method for measuring the weight applied on a rigid surface by a supporting member of a structure, the method comprising:
    maintaining the supporting member at an elevation above the rigid surface using a shim between a compression load cell attached to the supporting member and a load cell base attached to the rigid surface, the weight applied on the supporting member compressing the compression load cell;
    measuring deformation of the compression load cell to calculate the weight applied on the supporting member.

21. The method of claim 20 further comprising a step to maintain free movement of the supporting member by inserting a protecting material against perturbing elements present under the supporting member.

* * * * *